United States Patent [19]

Laurent et al.

[11] Patent Number: 4,908,218
[45] Date of Patent: * Mar. 13, 1990

[54] ZEOLITES IN POULTRY NUTRITION

[75] Inventors: Sebastian M. Laurent, Greenwell Springs; Robert N. Sanders, Baton Rouge, both of La.

[73] Assignee: Ethyl Corporation, Richmond, Va.

[*] Notice: The portion of the term of this patent subsequent to Dec. 3, 2002 has been disclaimed.

[21] Appl. No.: 145,232

[22] Filed: Jan. 19, 1988

Related U.S. Application Data

[60] Continuation-in-part of Ser. No. 42,987, Apr. 27, 1987, which is a continuation of Ser. No. 846,188, Mar. 3, 1986, abandoned, which is a continuation of Ser. No. 741,572, Jun. 5, 1985, abandoned, which is a division of Ser. No. 475,370, Mar. 14, 1983, Pat. No. 4,556,564.

[51] Int. Cl.$^4$ .............................................. A23K 1/00
[52] U.S. Cl. .......................................... 426/2; 426/74; 426/623; 426/630; 426/807
[58] Field of Search .................... 426/2, 74, 623, 630, 426/807

[56] References Cited

U.S. PATENT DOCUMENTS

| | | | |
|---|---|---|---|
| 3,836,676 | 9/1974 | Komakine | 426/74 |
| 4,515,780 | 5/1985 | Laurent et al. | 424/154 |
| 4,556,564 | 12/1985 | Laurent et al. | 426/2 |
| 4,610,882 | 9/1986 | Laurent et al. | 424/154 |
| 4,610,883 | 9/1986 | Laurent et al. | 424/154 |

FOREIGN PATENT DOCUMENTS

| | | |
|---|---|---|
| 939186 | 1/1974 | Canada . |
| 0224856 | 6/1987 | European Pat. Off. . |
| 59-203450 | 11/1984 | Japan . |

OTHER PUBLICATIONS

Mumpton et al, The Application of Natural Zeolites in Animal Science & Aquaculture, *Journal of Animal Science*, 45, No. 5, 1188–1203 (1977).
Chung et al, *Nongsa Sihom Youngu Pogo*, 1978, 20 (Livestock), pp. 77–83.
Nolen et al, *Food & Cosmetic Toxicology*, 21 (5), p. 697 (1983).
Excerpt from Nutritional Requirements of Poultry, Eighth Revised Edition (1984), National Academy Press, Washington, D.C. (1984).
Carlisle, *Nutrition Reviews*, 40 (7), pp. 193–198 (1982).
Carlisle, Chap. 4 of *Silicon & Siliceous Structures in Biological Systems*, Simpson, T. L., ed., B. E. Springer Verlag, New York (1981), pp. 69–94.
Edwards, *Poultry Science*, vol. 65, Supp. No. 1 (1986).
Roland et al, *Poultry Science* 64, 1177–1187 (1985).
Miles et al, *Nutrition Reports International* 34, No. 6, 1097 (Dec. 1986).
Ingram et al, *Influence of ETHACAL® Feed Component on Production Parameters of White Leghorn Hens During High Temperatures.*
Nakaue, *Poultry Science*, 60, 944–949 (1981).
Vest et al, studies presented at Zeo-Agriculture, '82.
Willis et al, *Poultry Science* 61, 438–442 (1982).
Reagan, Luther M., Effects of Adding Zeolites to the Diets of Broiler Cockerels; Thesis, Colorado State Univ., Recommended for Acceptance, Apr. 25, 1984.
Strong, Dr. Charles F. Jr., A Summary of the Southern Poultry Science Society Meeting, Apr. 1987, *Poultry Tribune.*
Holder et al, *Poultry Science*, Jan. 1979, vol. 58, No. 1, pp. 250–251.
Wells, R. G., *British Poultry Science*, Apr. 1967, vol. 8, pp. 131–139.

Primary Examiner—R. B. Penland

[57] ABSTRACT

Egg shell quality, egg shell thickness or egg specific gravity are improved, and/or the number of shell-less eggs reduced, when laying poultry is fed a diet comprising a zeolite such as zeolite A and a reduced chloride content. The chloride content of the diet can be below the level previously considered required. Thus, for chickens, both layers and broiler breeders, the chloride content can be below 0.15 percent. The level of zeolite A can be from about 0.25 to about 4.0 weight percent, more preferably from 0.75 to about 1.5 weight percent.

22 Claims, No Drawings

ZEOLITES IN POULTRY NUTRITION

CROSS REFERENCE TO RELATED APPLICATION

This application is a continuation-in-part of application Ser. No. 42,987 filed Apr. 27, 1987, which is a continuation of application Ser. No. 846,188 filed Mar. 3, 1986, now abandoned which is a continuation of application Ser. No. 741,572, filed Jun. 5, 1985, now abandoned which is a division of application Ser. No. 475,370 filed Mar. 14, 1983, now U.S. Pat. No. 4,556,564.

BACKGROUND OF THE INVENTION

1. Field of the Invention

The present invention is in the general field of poultry farming and relates to the feeding of fowl, including layers and broiler breeders. In a particular aspect, it relates to a method of feeding female birds with a feed formulation which enhances, for example, egg production, and/or egg shell quality. This invention also relates to the eggs with improved egg shells obtained from birds fed a diet of this invention. Poultry diets of this invention are typically diets which include an egg shell characteristic-enhancing amount of a zeolite such as zeolite A, and reduced chloride levels, e.g. levels below that recommended previously by the National Research Council. This invention also relates to improved poultry farming. Thus, it relates to methods which provide improved egg or broiler production. These methods comprise obtaining an increase in yield of marketable or settable eggs from laying hens. The increase is provided by feeding hens a diet of this invention.

2. Description of Related Art

In previously issued patents, we disclosed that zeolite A enhances egg shell quality, U.S. Pat. No. 4,556,564; improves feed utilization efficiency, U.S. Pat. No. 4,610,882; and improves liveability, U.S. Pat. No. 4,610,883. The disclosures in those patents are incorporated by reference herein as if fully set forth. Other related art is mentioned in the patents.

An article by C. Y. Chung et al from Nongsa Sihom Youngu Pogo 1978, 20 (Livestock) pp. 77-83 discusses the effects of cation exchange capacity and particle size of zeolites on the growth, feed efficiency and feed materials utilizability of broilers or broiling size chickens. Supplementing the feed of the broilers with naturally occurring zeolites, such as clinoptilolite, some increase in body weight gain was determined. Chung et al also reported that earlier results at the Livestock Experiment Station (1974, 1975, 1976—Suweon, Korea) showed that no significant difference was observed when 1.5, 3, and 4.5 percent zeolite was added to chicken layer diets.

U.S. Pat. No. 3,836,676 issued to Chukei Komakine in 1974 discloses the use of zeolites and ferrous sulfate crystals in an odorless chicken feed comprising such crystals and chicken droppings. The results were said to be no less than those in the case where chickens were raised with ordinary feed.

Experiments have been in progress in Japan since 1965 on the use of natural zeolite minerals as dietary supplements for poultry, swine and cattle. Significant increases in body weight per unit of feed consumed and in the general health of the animals was reported (Minato, Hideo, Koatsugasu 5:536, 1968). Reductions in malodor were also noted.

Using clinoptilolite and mordenite from northern Japan, Onagi, T. (Rept. Yamagata Stock Raising Inst. 7, 1966) found that Leghorn chickens required less food and water and gained as much weight in a two-week trial as birds receiving a control diet. No adverse effects on health or mortality were noted. The foregoing Japanese experiments were reported by F. A. Mumpton and P. H. Fishman in the *Journal of Animal Science*, Vol. 45, No. 5 (1977) pp. 1188-1203.

Canadian Pat. No. 939,186 issued to White et al in 1974 discloses the use of zeolites having exchangeable cations as a feed component in the feeding of urea or biuret non-protein (NPR) compounds to ruminants, such as cattle, sheep and goats. Natural and synthetic as well as crystalline and non-crystalline zeolites are disclosed. Zeolites tested included natural zeolites, chabazite and clinoptilolite and synthetic zeolites X, Y, F, J, M, Z, and A. Zeolite F was by far the most outstanding and zeolite A was substantially ineffective.

In a study at the University of Georgia, both broilers and layers were fed small amounts (about 2%) of clinoptilolite, a naturally occurring zeolite from Tilden, Tex. The egg shells from the hens receiving zeolite were slightly more flexible as measured by deformation, slightly less strong as measured by Instron breaking strength, and had a slightly lower specific gravity. The differences in egg shell quality were very small. This type of zeolite was ineffective in producing a stronger egg shell. An article written by Larry Vest and John Shutze entitled "The Influence of Feeding Zeolites to Poultry Under Field Conditions" summarizing the studies was presented at Zeo-Agriculture +82.

A study by H. S. Nakone of feeding White Leghorn layers clinoptilolite, reported in 1981 Poultry Science 60:944-949, disclosed no significant differences in egg shell strength between hens receiving the zeolite and hens not receiving the zeolite.

SUMMARY OF THE INVENTION

The demand for poultry eggs, especially chicken eggs expanded considerably over the last decade. The poultry industry has grown from a home industry to a large scale manufacturing industry in which tens of thousands of eggs are produced daily at single farms or egg laying installations. Some eggs are produced for eating and some eggs are produced for hatching. One problem with such large scale egg producing is breakage. Even a slight crack in an egg makes it unsuitable for hatching and most other marketing purposes. It is estimated that some six percent of all eggs produced are lost for marketing because of cracking or breakage. Shell strength is very important to inhibit breakage. The stronger the egg shell, the less likely the egg will be cracked or broken. Machinery and techniques necessary for carefully handling the eggs to avoid breakage are expensive and time consuming.

Another substantial loss of egg production, estimated to be about a seven percent loss, is the production of shell-less eggs. Any reduction in shell-less eggs can be an important factor in large scale egg production.

As stated above, our previously issued U.S. Pat. No. 4,556,564 discloses that zeolite A in poultry feed improves egg shell quality.

In *Nutrient Requirements of Poultry*, Eighth Revised Edition 1984, National Academy Press, Washington, D.C. (1984) it is stated in Table 4, (page 12) that leghorn-type chickens, both layers and breeders, have a dietary requirement of 0.15 weight % chlorine per day. Assuming an average daily intake per hen of 110 g of feed per day, this amounts to 165 mg of chlorine, per hen per day. This requirement is usually furnished as chloride ion, typically in salt, i.e. NaCl.

We have discovered that egg production, egg quality, and/or egg shell quality of poultry eggs is enhanced if the chloride level in poultry diets is decreased below the previously recommended requirement, and a zeolite is added to the diet. The improvement can result in the production of more collectable eggs, which with broiler breeder hens means more eggs that are settable in incubators.

The enhancement of results provided by reduction of chloride levels below the previously required amount is unexpected.

DESCRIPTION OF PREFERRED EMBODIMENTS

This invention comprises a method for improving eggs, egg production and/or egg shell quality. This method comprises feeding birds a diet which (a) contains reduced amounts of chlorine, e.g. less chloride than what was previously recognized as required, and which (b) also contains a zeolite such as zeolite A. Thus, in an important aspect, this invention can be considered a method of enhancing an egg shell improving property quality of a zeolite, which method comprises reducing the chloride intake of birds fed a zeolite incorporated in their diet.

Zeolites are crystalline, hydrated aluminosilicates of alkali and alkaline earth cations, having infinite, three-dimensional structures.

Zeolites consist basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

Zeolite A may be distinguished from other zeolites and silicates on the basis of their composition and X-ray powder diffraction patterns and certain physical characteristics. The X-ray patterns for these zeolites are described below. The composition and density are among the characteristics which have been found to be important in identifying these zeolites.

The basic formula for all crystalline sodium zeolites may be represented as follows:

$$Na_2O \cdot Al_2O_3 \cdot xSiO_2 \cdot yH_2O$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range $1.85 \pm 0.5$.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for "y" for zeolite A is 5.1. The formula for zeolite A may be written as follows:

$$1.0 \pm 0.2\ Na_2O\ Al_2O_3\ 1.85 \pm 0.5\ SiO_2 \cdot yH_2O.$$

In the formula, "y" may be any value up to 6.

An ideal zeolite A has the following formula:

$$(NaAlSiO_4)_{12} \cdot 27H_2O$$

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the K doublet of copper and a Geiger counter spectrometer with a strip chart pen recorder is used. The peak heights, I, and the positions as a function of $2\theta$ where $\theta$ is the Bragg angle, are read from a spectrometer chart. From these, the relative intensities, $100\ I/I_0$, where $I_0$ is the intensity of the strongest line or peak and d the interplanar spacing in angstroms corresponding to the recorded lines are calculated.

X-ray powder diffraction data for a sodium zeolite A are given in Table I.

TABLE A

X-RAY DIFFRACTION PATTERN FOR ZEOLITE A

| $h^2 + k^2 + l^2$ | d (A) | $\dfrac{100\ I}{I_0}$ |
|---|---|---|
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | <1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The more significant d values for zeolite A are given in Table B.

TABLE B
MOST SIGNIFICANT d VALUES FOR ZEOLITE A

| d Value of Reflection in A |
|---|
| 12.2 ± 0.2 |
| 8.7 ± 0.2 |
| 7.10 ± 0.15 |
| 5.50 ± 0.10 |
| 4.10 ± 0.10 |
| 3.70 ± 0.07 |
| 3.40 ± 0.06 |
| 3.29 ± 0.05 |
| 2.98 ± 0.05 |
| 2.62 ± 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3} = 0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,243 describes a process for making zeolite A comprising preparing a sodium-aluminum-silicate water mixture having an $SiO_2:Al_2O_3$ mole ratio of from 0.5:1 to 1.5:1, and $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

The present invention relates to a method of improving the egg shell characteristics, e.g. egg shell strength of eggs from laying poultry. A convenient means of measuring egg shell strength is by measuring the specific gravity of the egg. This is simply done by immersing the egg in solutions of salt water of varying strengths. It is well known in the art that specific gravity correlates with egg shell strength. As specific gravity of the egg is raised, the strength of the egg shell is increased.

The method of this invention can also improve egg shell thickness, and/or decrease the number of eggs produced without shells.

The improvements of this invention are obtained by adding a zeolite to the diet of laying poultry. The zeolite can be added to regular or standard poultry feed or administered directly to the birds by some other means. The percent of zeolite (such as zeolite A) in the diet is typically from about 0.25 to about 3 or 4 weight percent, as discussed below. For this invention, chloride intake of the birds is reduced, even below the levels previously recognized as required. For leghorn-type poultry the chlorine level in the diets used in this invention are below 0.15 weight percent; more preferably, between about 0.04 and 0.10 weight percent.

The benefits of this invention can be obtained with ETHACAL ® feed component, a commercially available form of sodium zeolite A.

As indicated above, Zeolite A is added to such feed formulation in small amounts by weight percent of up to about four weight percent. Greater amounts may be used, but may deprive the poultry of the desired amount of nutrients. Greater amounts are also likely to be cost ineffective. A preferred amount of zeolite A is from about one-half to about two percent by weight of the total feed formulation. A most preferred amount of zeolite A is from about 0.75 to about 1.50 weight percent of the total feed formulation.

For this invention the term "poultry" includes all domestic fowl, namely chickens, turkeys, ducks, geese, and the like.

Corn is the principal diet for most laying poultry. A feed formulation comprising by weight percent the following is desirable:

|  | Weight Percent |
|---|---|
| corn | 50–75 |
| soybean meal | 10–30 |
| calcium carbonate | 4–10 |
| zeolite A | 0.25–4.0 |

A typical feed preparation for large scale laying hen operations comprises the following by weight percent:

| | |
|---|---|
| Corn | 62–68 |
| Soy Bean Meal | 18½–24 |
| Limestone | 5–9 |
| Alfalfa Meal | 1 |
| Phosphates | 2 |
| Sand | 1–2 |
| Vitamins, Amino Acids | |
| Salt and Other Minerals | 0–1 |

Calcium carbonate is usually in the form of natural limestone ground to a suitable particle size, but sometimes oyster shells which have also been suitably ground are used.

It can be appreciated that a wide variety of nutrients or foods may be included in the diets of layers, or poultry laying hens. In a controlled environment, the hens are only exposed to desired foods or food products. A typical laying ration composition contains the following:

| | Weight Percent |
|---|---|
| crude protein - not less than | 16.0 |
| crude fat - not less than | 2.5 |
| crude fiber - not more than | 7.0 |
| calcium (as Ca) - not less than | 3.1 |
| calcium (as Ca) - not more than | 4.1 |
| phosphorus (P) - not less than | 0.5 |
| iodine (I) - not less than | 0.0001 |
| salt (NaCl) - not less than | 0.3 |
| salt (NaCl) - not more than | 0.9 |

(For this invention the salt content is reduced from the range given above.)

The foregoing composition may be obtained from or include the following ingredients:

Grain and processed grain by-products. Includes corn, corn hominy, corn germ meal, barley, millet, oats, rice, rice hulls, rye, sorghum, wheat and wheat shorts. These are among the energy ingredients, mostly carbohydrates with some proteins.

Plant protein products. Includes soybean oil meal, barly malt sprouts, coconut meal, corn distillers grain, corn gluten meal, cottonseed meal, pea seed, potato meal, peanut meal, rape seed meal, sunflower meal, wheat germ meal, brewers' yeast. All of these are protein sources.

Roughage or fiber. Includes dehydrated alfalfa, alfalfa hay, alfalfa leaf meal and pasture grasses. These are all fiber sources.

Animal and fish by-products. Includes blood meal, blood flour, dried buttermilk, dried whey, dried casein, fish meal, dried fish solubles, liver meal, meat meal, meat meal tankage, bone meal and dried skim milk. Anchovies, herring and menhaden are sources of fish meal.

Minerals and synthetic trace ingredients. Includes vitamins such as B-12, A, pantothenate, niacin, riboflavin, K, etc., DL methionine, choline chloride, folic acid, dicalcium phosphate, magnesium sulfate, potassium sulfate, calcium carbonate (limestone, oyster shells), salt, sodium selenite, manganous oxide, calcium iodate, copper oxide, zinc oxide and D activated animal sterol.

Molasses and animal fats are added to improve palatability and to increase or balance the energy levels.

Preservatives are also added such as, Ethoxyquin ™ and sodium sulfite.

In general, a feed composition of this invention for laying hens should preferably contain, by weight percent, the following:

| | Weight Percent |
|---|---|
| crude protein - at least about | 14 |

| -continued | |
|---|---|
| | Weight Percent |
| crude fat - at least about | 2 |
| crude fiber - not more than about | 7 |
| calcium - about | 2.7 to 4.1 |
| phosphorus - at least about | 0.05 |
| iodine - at least | 0.0001 |
| sodium - about | 0.1 to 0.4 |
| chlorine - about | 0.04 to 0.10 |
| zeolite A - about | 0.25 to 4.0 |

EXAMPLE 1

A total of 880 commercial laying hens were divided into groups of 110 birds each and fed isocaloric diets containing various levels of chloride, Table 1.

TABLE 1

| | Diet Number and Percent Composition | | | | | | | |
|---|---|---|---|---|---|---|---|---|
| Dietary Ingredient | 1 | 2 | 3 | 4 | 5 | 6 | 7 | 8 |
| Corn | 56.99 | 56.99 | 56.99 | 56.99 | 56.99 | 56.99 | 56.99 | 56.99 |
| Soybean Meal | 28.33 | 28.33 | 28.33 | 28.33 | 28.33 | 28.33 | 28.33 | 28.33 |
| Dicalcium Phosphate | 2.43 | 2.43 | 2.43 | 2.43 | 2.43 | 2.43 | 2.43 | 2.43 |
| Oyster Shell Flour | 6.90 | 6.90 | 6.90 | 6.90 | 6.90 | 6.90 | 6.90 | 6.90 |
| Vitamin/Trace Mineral | 0.25 | 0.25 | 0.25 | 0.25 | 0.25 | 0.25 | 0.25 | 0.25 |
| Salt (NaCl) | 0.35 | 0.25 | 0.35 | 0.25 | 0.15 | 0.10 | 0.05 | 0.00 |
| Tallow | 4.00 | 4.00 | 4.00 | 4.00 | 4.00 | 4.00 | 4.00 | 4.00 |
| Zeolite A | 0.00 | 0.00 | 0.75 | 0.75 | 0.75 | 0.75 | 0.75 | 0.75 |
| Sand | 0.75 | 0.85 | 0.00 | 0.10 | 0.20 | 0.25 | 0.30 | 0.35 |
| Chloride Levels | 0.25 | 0.19 | 0.25 | 0.19 | 0.13 | 0.10 | 0.07 | 0.04 |

The results of this study show that after four weeks on the diets, those birds fed diets with 0.75% zeolite A laid eggs having higher specific gravity than those laid by the birds without dietary zeolite. This difference was enhanced as the dietary chloride level was decreased, diets 6, 7 and 8, Table II.

Table III shows that only at extremely low chloride levels is egg weight affected, diets 7 and 8. This is also true for egg production effects, Table IV, diets 7 and 8.

Feed consumption after three weeks, Table V, is only significantly affected at the very lowest chloride level, diet 8. In this diet the only chloride available is that found in the corn and soybean meal components of the diet.

Table VI shows that the body weight of the birds had been significantly reduced when on the two lowest chloride diets.

In the following tables the significance of the superscripts is as follows. In the columns, data with different superscripts are significantly different, and data with the same are not, both to the 95% confidence level. For example, in Table II, the column for Two Weeks, the first entry, 1.0853±05, is significantly different from all other values in the table except the third entry; 1.0864±03. In the same column, the five values which have a "C" in the superscript are not significantly different.

The small numbers of birds used in the trials makes the statistics less definitive than desired. Although big numerical differences in some of the tables are not statistically different, they are indicative of trends.

TABLE II

| | | | Specific Gravity | | |
|---|---|---|---|---|---|
| | Chloride | Zeolite | | Weeks | |
| Diet | % | A % | 0 | 2 | 4 |
| 1 | 0.25 | 0 | 1.0881 ± 04$^a$ | 1.0853 ± 5$^d$ | 1.0871 ± 04$^c$ |
| 2 | 0.19 | 0 | 1.0888 ± 04$^a$ | 1.0853 ± 05$^c$ | 1.0881 ± 04$^{bc}$ |

TABLE II-continued

Specific Gravity

| Diet | Chloride % | Zeolite A % | Weeks 0 | 2 | 4 |
|---|---|---|---|---|---|
| 3 | 0.25 | 0.75 | $1.0884 \pm 04^a$ | $1.0864 \pm 03^{cd}$ | $1.0888 \pm 03^b$ |
| 4 | 0.19 | 0.75 | $1.0881 \pm 6^a$ | $1.0871 \pm 05^{bc}$ | $1.0882 \pm 05^{bc}$ |
| 5 | 0.13 | 0.75 | $1.0887 \pm 05^a$ | $1.0871 \pm 05^{bc}$ | $1.0885 \pm 04^b$ |
| 6 | 0.10 | 0.75 | $1.0885 \pm 05^a$ | $1.0886 \pm 03^a$ | $1.0907 \pm 05^a$ |
| 7 | 0.07 | 0.75 | $1.0881 \pm 04^a$ | $1.0881 \pm 03^{ab}$ | $1.0904 \pm 05^a$ |
| 8 | 0.04 | 0.75 | $1.0879 \pm 06^a$ | $1.0872 \pm 04^{bc}$ | $1.0907 \pm 05^a$ |

TABLE III

Egg Weight

| Diet | Chloride % | Zeolite A % | Weeks 0 | 2 | 4 |
|---|---|---|---|---|---|
| 1 | 0.25 | 0 | $57.6 \pm 0.6^a$ | $59.8 \pm 0.5^{ab}$ | $61.4 \pm 0.5^a$ |
| 2 | 0.19 | 0 | $57.7 \pm 0.5^a$ | $60.2 \pm 0.5^a$ | $60.5 \pm 0.8^a$ |
| 3 | 0.25 | 0.75 | $58.3 \pm 0.3^a$ | $60.3 \pm 0.3^a$ | $61.6 \pm 0.4^a$ |
| 4 | 0.19 | 0.75 | $60.8 \pm 2.8^a$ | $59.6 \pm 0.5^{abc}$ | $61.0 \pm 0.3^a$ |
| 5 | 0.13 | 0.75 | $58.1 \pm 0.8^a$ | $60.3 \pm 0.2^a$ | $61.4 \pm 0.3^a$ |
| 6 | 0.10 | 0.75 | $57.8 \pm 0.4^a$ | $58.8 \pm 0.3^{bcd}$ | $60.7 \pm 0.8^a$ |
| 7 | 0.07 | 0.75 | $58.0 \pm 0.3^a$ | $58.5 \pm 0.3^{cd}$ | $57.6 \pm 0.5^b$ |
| 8 | 0.04 | 0.75 | $58.5 \pm 0.5^a$ | $57.8 \pm 0.6^d$ | $54.5 \pm 1.7^c$ |

TABLE IV

Egg Production (%)

| Diet | Chloride % | Zeolite A % | Weeks 1 | 2 | 3 | 4 |
|---|---|---|---|---|---|---|
| 1 | 0.25 | 0 | $79.6 \pm 3.4^a$ | $70.9 \pm 2.9^{ab}$ | $84.3 \pm 3.2^b$ | $78.6 \pm 2.5^a$ |
| 2 | 0.19 | 0 | $86.6 \pm 01.3^a$ | $73.9 \pm 2.1^a$ | $87.3 \pm 2.0^a$ | $81.3 \pm 2.2^a$ |
| 3 | 0.25 | 0.75 | $83.8 \pm 2.4^a$ | $71.2 \pm 2.0^{ab}$ | $79.3 \pm 3.4^{ab}$ | $76.7 \pm 2.9^a$ |
| 4 | 0.19 | 0.75 | $84.5 \pm 1.6^a$ | $76.0 \pm 1.5^{ab}$ | $86.6 \pm 1.2^{ab}$ | $83.0 \pm 1.2^a$ |
| 5 | 0.13 | 0.75 | $81.4 \pm 2.5^a$ | $70.2 \pm 2.6^{ab}$ | $77.9 \pm 2.4^b$ | $80.8 \pm 2.1^a$ |
| 6 | 0.10 | 0.75 | $75.3 \pm 5.2^a$ | $69.1 \pm 3.2^{ab}$ | $78.1 \pm 3.2^b$ | $79.2 \pm 2.5^a$ |
| 7 | 0.07 | 0.75 | $79.9 \pm 2.3^a$ | $65.1 \pm 3.1^b$ | $67.8 \pm 3.8^c$ | $61.2 \pm 1.4^b$ |
| 8 | 0.04 | 0.75 | $82.0 \pm 1.9^a$ | $56.2 \pm 2.9^c$ | $39.0 \pm 3.0^d$ | $27.0 \pm 2.1^c$ |

TABLE V

Feed Consumption (g/bird/day)

| Diet | Chloride % | Zeolite A % | Weeks 1 | 2 | 3 |
|---|---|---|---|---|---|
| 1 | 0.25 | 0 | $102 \pm 3^{ab}$ | $103 \pm 3^{ab}$ | $107 \pm 3^a$ |
| 2 | 0.19 | 0 | $107 \pm 2^a$ | $107 \pm 1^{ab}$ | $104 \pm 2^a$ |
| 3 | 0.25 | 0.75 | $102 \pm 2^{ab}$ | $102 \pm 1^{bc}$ | $104 \pm 1^a$ |
| 4 | 0.19 | 0.75 | $107 \pm 2^a$ | $109 \pm 1^a$ | $104 \pm 2^a$ |
| 5 | 0.13 | 0.75 | $100 \pm 2^b$ | $107 \pm 2^{ab}$ | $104 \pm 2^a$ |
| 6 | 0.10 | 0.75 | $101 \pm 2^{ab}$ | $104 \pm 1^{ab}$ | $104 \pm 1^a$ |
| 7 | 0.07 | 0.75 | $99 \pm 2^b$ | $98 \pm 2^c$ | $102 \pm 2^a$ |
| 8 | 0.04 | 0.75 | $97 \pm 2^b$ | $90 \pm 3^d$ | $94 \pm 3^b$ |

TABLE VI

Body Weight (g)

| Diet | Chloride % | Zeolite A % | Weeks 1 | 2 | 3 | 4 |
|---|---|---|---|---|---|---|
| 1 | 0.25 | 0 | $1597 \pm 21^a$ | $1643 \pm 23^a$ | $1654 \pm 21^a$ | $1673 \pm 20^a$ |
| 2 | 0.19 | 0 | $1593 \pm 18^c$ | $1631 \pm 10^{ab}$ | $1646 \pm 23^a$ | $1646 \pm 18^a$ |
| 3 | 0.25 | 0.75 | $1594 \pm 25^a$ | $1605 \pm 22^{ab}$ | $1611 \pm 21^{ab}$ | $1636 \pm 22^a$ |
| 4 | 0.19 | 0.75 | $1599 \pm 23^a$ | $1640 \pm 24^{ab}$ | $1655 \pm 26^a$ | $1662 \pm 23^a$ |
| 5 | 0.13 | 0.75 | $1558 \pm 16^a$ | $1623 \pm 21^{ab}$ | $1628 \pm 11^a$ | $1649 \pm 12^a$ |
| 6 | 0.10 | 0.75 | $1545 \pm 21^a$ | $1576 \pm 17^{bc}$ | $1594 \pm 16^{ab}$ | $1625 \pm 15^a$ |
| 7 | 0.07 | 0.75 | $1571 \pm 12^a$ | $1542 \pm 22^{cd}$ | $1556 \pm 19^{bc}$ | $1564 \pm 18^{ba}$ |
| 8 | 0.04 | 0.75 | $1568 \pm 20^a$ | $1513 \pm 22^d$ | $1494 \pm 38^c$ | $1548 \pm 20^b$ |

EXAMPLE 2

A total of 42 end of lay (60 week old) broiler breeders were housed in individual cages and divided into three groups of 14 birds each. The groups were fed the following diets:

TABLE VII

| Ingredient, % | Diet 1 | 2 | 3 |
|---|---|---|---|
| Corn | 75.81 | 75.81 | 75.81 |
| Soybean Meal | 15.00 | 15.00 | 15.00 |
| Oyster Shell Flour | 6.24 | 6.24 | 6.24 |
| Dicalcium Phosphate | 0.33 | 0.33 | 0.33 |
| D,L-Methionine | 0.08 | 0.08 | 0.08 |
| Vitamin-Mineral Mix | 0.25 | 0.25 | 0.25 |
| Salt (NaCl) | 0.48 | 0.00 | 0.00 |
| Sand | 1.81 | 0.00 | 0.79 |
| HCl | 0.00 | 0.79 | 0.00 |
| Zeolite A | 0.00 | 1.50 | 1.50 |
| Chloride Content, % | 0.328 | 0.325 | 0.035 |

The results of this study are listed in the following tables:

TABLE VIII

Broiler Breeder Egg Production (% Hen Days)

| Diet | Chloride % | Zeolite A % | Weeks 1 | 2 | 3 | 4 | 5 | 6 | 7 | 8 | 9 | 10 |
|---|---|---|---|---|---|---|---|---|---|---|---|---|
| | 0.32 | 0 | $60.2^a$ | $60.2^a$ | $59.2^a$ | $63.3^a$ | $57.1^a$ | $50.0^a$ | $52.0^a$ | $54.1^a$ | $56.1^a$ | $56.1^a$ |
| | 0.325 | 1.5 | $54.1^a$ | $63.3^a$ | $56.1^a$ | $56.1^a$ | $49.0^a$ | $54.1^a$ | $59.2^a$ | $53.1^a$ | $65.3^a$ | $66.3^a$ |
| | 0.035 | 1.5 | $62.2^a$ | $60.2^a$ | $54.1^a$ | $53.6^a$ | $62.6^a$ | $51.2^a$ | $56.0^a$ | $52.4^a$ | $58.9^a$ | $53.2^a$ |

TABLE IX

| | | Specific Gravity | | | | |
|---|---|---|---|---|---|---|
| | | | | Weeks | | |
| Diet | Chloride % | Zeolite A % | 1 | 3 | 5 | 7 | 9 |
| 1 | 0.328 | 0 | 1.0836$^a$ | 1.0802$^b$ | 1.0795$^b$ | 1.0807$^b$ | 1.0808$^b$ |
| 2 | 0.325 | 1.5 | 1.0814$^a$ | 1.0833$^a$ | 1.0811$^b$ | 1.0809$^b$ | 1.0814$^a$ |
| 3 | 0.035 | 1.5 | 1.0831$^a$ | 1.0838$^a$ | 1.0849$^a$ | 1.0853$^a$ | 1.0857$^a$ |

TABLE X

| | | Shell Thickness | | | | |
|---|---|---|---|---|---|---|
| | | | | Weeks | | |
| Diet | Chloride % | Zeolite A % | 1 | 3 | 5 | 7 | 9 |
| 1 | 0.328 | 0 | .035$^a$ | .035$^a$ | .035$^b$ | .035$^b$ | .036$^b$ |
| 2 | 0.325 | 1.5 | .036$^a$ | .036$^a$ | .035$^{ab}$ | .035$^b$ | .036$^b$ |
| 3 | 0.035 | 1.5 | .036$^a$ | .036$^a$ | .037$^a$ | .037$^a$ | .037$^a$ |

TABLE XI

| | | Percent Shell | | | | |
|---|---|---|---|---|---|---|
| | | | | Weeks | | |
| Diet | Chloride % | Zeolite A % | 1 | 3 | 5 | 7 | 9 |
| 1 | 0.328 | 0 | 8.74$^a$ | 8.61$^b$ | 8.60$^b$ | 8.69$^b$ | 8.75$^b$ |
| 2 | 0.325 | 1.5 | 8.86$^a$ | 9.04$^b$ | 8.84$^b$ | 8.72$^b$ | 8.88$^{ab}$ |
| 3 | 0.035 | 1.5 | 9.03$^a$ | 9.11$^a$ | 9.27$^a$ | 9.22$^a$ | 9.15$^a$ |

TABLE XII

| | | Shell-less and Membrane Egg Production (%) | | | | | | | | | |
|---|---|---|---|---|---|---|---|---|---|---|
| | | | | | | Weeks | | | | | |
| Diet | Chloride % | Zeolite A % | 1 | 2 | 3 | 4 | 5 | 6 | 7 | 8 | 9 | 10 |
| 1 | 0.328 | 0 | 6.7$^a$ | 18.6$^a$ | 7.1$^a$ | 19.9$^b$ | 30.5$^b$ | 11.4$^a$ | 9.5$^a$ | 18.3$^a$ | 19.2$^b$ | 27.7$^a$ |
| 2 | 0.325 | 1.5 | 9.5$^a$ | 8.9$^a$ | 3.1$^a$ | 0$^a$ | 6.3$^a$ | 5.9$^a$ | 2.1$^a$ | 8.3$^a$ | 1.8$^a$ | 16.8$^a$ |
| 3 | 0.035 | 1.5 | 6.4$^a$ | 4.6$^a$ | 0$^a$ | 2.4$^a$ | 9.2$^a$ | 2.3$^a$ | 0$^a$ | 1.5$^a$ | 0$^a$ | 8.7$^a$ |

TABLE XIII

| | | Broiler Breeder Collectable Egg Production (% Hen Days) | | | | | | | | | |
|---|---|---|---|---|---|---|---|---|---|---|
| | | | | | | Weeks | | | | | |
| Diet | Chloride % | Zeolite A % | 1 | 2 | 3 | 4 | 5 | 6 | 7 | 8 | 9 | 10 |
| 1 | 0.328 | 0 | 44.9$^a$ | 52.0$^a$ | 55.1$^a$ | 51.0$^a$ | 41.8$^a$ | 44.9$^a$ | 46.9$^a$ | 43.9$^a$ | 44.9$^a$ | 43.9$^a$ |
| 2 | 0.325 | 1.5 | 49.0$^a$ | 58.2$^a$ | 54.1$^a$ | 56.1$^a$ | 46.9$^a$ | 49.0$^a$ | 58.2$^a$ | 50.0$^a$ | 64.3$^a$ | 55.1$^a$ |
| 3 | 0.035 | 1.5 | 58.2$^a$ | 57.1$^a$ | 54.1$^a$ | 52.6$^a$ | 50.4$^a$ | 50.0$^a$ | 56.0$^a$ | 51.2$^a$ | 58.9$^a$ | 49.4$^a$ |

TABLE XIV

| | | Broiler Breeder Body Weight (g) | | |
|---|---|---|---|---|
| Diet | Chloride % | Zeolite A % | Week 1 | Week 9 | GAIN |
| 1 | 0.328 | 0 | 3444$^a$ | 3690$^a$ | 246$^a$ |
| 2 | 0.325 | 1.5 | 3264$^a$ | 3562$^a$ | 296$^a$ |
| 3 | 0.035 | 1.5 | 3197$^a$ | 3554$^a$ | 278$^a$ |

TABLE XV

| | | Broiler Breeder Feed Consumption | | | | | | | | | |
|---|---|---|---|---|---|---|---|---|---|---|
| | | | | | | Weeks | | | | | |
| Diet | Chloride % | Zeolite % | 1 | 2 | 3 | 4 | 5 | 6 | 7 | 8 | 9 | 10 |
| 1 | 0.328 | 0 | 155$^a$ | 155$^a$ | 148$^a$ | 151$^a$ | 151$^a$ | 151$^a$ | 151$^a$ | 150$^a$ | 152$^a$ | 145$^a$ |
| 2 | 0.325 | 1.5 | 155$^a$ | 155$^a$ | 145$^a$ | 142$^a$ | 140$^a$ | 146$^a$ | 144$^a$ | 144$^a$ | 146$^a$ | 144$^a$ |
| 3 | 0.035 | 1.5 | 155$^a$ | 155$^a$ | 155$^a$ | 148$^a$ | 149$^a$ | 149$^a$ | 150$^a$ | 150$^a$ | 143$^a$ | 149$^a$ |

SUMMARY OF RESULTS

In Example 2 hens fed the zeolite A, low chloride diet laid eggs with the highest specific gravity, shell thickness and percent shell, and they produced the lowest percentage of shell-less or membrane eggs, Tables IX, X, XI, and XII. Hens fed the zeolite A diets containing high chloride, equivalent to the chloride level of the control diet (Diet 1), also laid eggs with the same improvements, but of lesser magnitude than the low chloride fed hens. These improvements result in the production of more collectable eggs (Table XIII), which with broiler breeder hens means more eggs that are sellable in incubators. Tables VIII and XV show that inclusion of zeolite A in the diets have no adverse effect on overall egg production or feed consumption. Table XIV shows that inclusion of zeolite in the diet results in increased weight gain suggesting that improved feed utilization is occurring.

The above results suggest the use of zeolite A levels in the diet of from about 0.25 to about 3.0 weight percent, or up to about 4.0 weight percent. The above results also suggest that for chickens, both layers and broiler breeders, the chlorine content (% chloride) in the diet can be less than about 0.15 weight percent. Preferably the chloride content is from about 0.04 to about 0.10 weight percent.

The results set forth in the Examples above demonstrate the advantages of this invention in improving egg shell quality, shell thickness, percent shell, or in reducing the number of shell-less or membrane eggs. Any such benefit, for the purposes of this invention is referred to as an improved egg shell characteristic.

The above results demonstrate an improved process for enhancing an egg shell characteristic which comprises regularly feeding to laying poultry a diet which comprises a zeolite such as zeolite A and which also contains a reduced chlorine content. As shown, the diets of this invention can contain an amount of chlorine (as chloride) which is below that which was previously recognized as required. Such diets are referred to herein as chloride deficient diets. These diets can comprise the chloride content supplied by the corn and soybean meal or similar portions of the diet without any added chloride source (such as salt, i.e. NaCl), or with an amount of salt or other chloride below that which is commonly added to the diet, as illustrated above.

Generally speaking, one uses enough zeolite such as zeolite A to provide the benefit or benefits conferred by such additive. Preferred ranges are set forth above. Besides processes comprising feeding birds, this invention also provides diets or feed formulations which have zeolite and chloride contents as discussed above. Preferred aspects of this invention comprise use of such diets for poultry, although diets of this invention can be used in other aspects of animal husbandry such as in the care and feeding of endangered, wild species. Of the poultry species, chickens, including layers and broiler breeders are highly preferred. Use of the diets of this invention provides improved methods of poultry farming which result in more eggs that are usable, and which have desirable characteristics.

Having described this invention and its benefits in detail above, it will be apparent that a skilled practitioner can make modifications and changes of the invention as above-described without departing from the scope or spirit of the claims which follow.

What is claimed is:

1. A process for increasing the yield of collectable eggs of a laying poultry hen, said process comprising providing to the hen a daily diet which contains less than 0.15 weight percent chlorine as chloride, and which contains from about 0.25 to about 3.0 weight percent zeolite A.

2. The process of claim 1 wherein the amount of zeolite A in said diet is from about 0.75 to about 1.5 weight percent.

3. The process of claim 1 wherein the amount of chlorine as chloride in said daily diet is from about 0.04 to about 0.10 weight percent chloride.

4. The process of claim 1 wherein said diet is principally grain.

5. The process of claim 1 wherein the yield of collectable eggs is increased at least in part due to a reduction in the number of shell-less or membrane eggs formed.

6. The process of claim 1 wherein the yield of collectable eggs is increased at least in part due to an average increase in egg shell thickness in the eggs formed.

7. The process of claim 1 wherein the yield of collectable eggs is increased at least in part due to an average increase in percent shell in the eggs formed.

8. The process of claim 1 wherein the amount of chlorine as chloride in said daily diet is from about 0.04 to about 0.10 weight percent chloride and wherein the amount of zeolite A in said diet is from about 0.75 to about 1.5 weight percent.

9. The process of claim 8 wherein said diet is principally grain.

10. A process for increasing the yield of collectable eggs of a laying poultry hen, said process comprising (a) preparing a daily chloride-containing poultry diet containing less than 0.15 weight percent chlorine as chloride, said diet containing from about 0.25 to about 3.0 weight percent zeolite A, (b) providing such diet to the hen over a period of time, and (c) recovering over said period of time an egg crop with an increased yield of collectable eggs from said hen.

11. The process of claim 10 wherein the amount of zeolite A in said diet is from about 0.75 to about 1.5 weight percent.

12. The process of claim 11 wherein said diet is principally grain.

13. The process of claim 11 wherein the yield of collectable eggs is increased at least in part due to a reduction in the number of shell-less or membrane egg formed.

14. The process of claim 11 wherein the yield of collectable eggs is increased at least in part due to an average increase in egg shell thickness in the eggs formed.

15. The process of claim 11 wherein the yield of collectable eggs is increased at least in part due to an average increase in percent shell in the eggs formed.

16. The process of claim 11 wherein the amount of chlorine as chloride in said daily diet is from about 0.04 to about 0.10 weight percent chloride and wherein the amount of zeolite A in said diet is from about 0.75 to about 1.5 weight percent.

17. The process of claim 16 wherein said diet is principally corn.

18. The process of claim 10 wherein the amount of chlorine as chloride in said daily diet is from about 0.04 to about 0.10 weight percent chloride.

19. A feed formulation for poultry comprising at least 0.04 but less than 0.15 weight percent chlorine as chloride, and from about 0.25 to about 3.0 weight percent zeolite A.

20. The feed formulation of claim 19 for chickens comprising principally grain.

21. The feed formulation of claim 19 wherein the amount of chlorine as chloride is below about 0.10 weight percent.

22. The feed formulation of claim 19 for chickens comprising principally corn, the amount of chlorine as chloride in said formulation being below about 0.10 weight percent.

* * * * *